Figure 1:
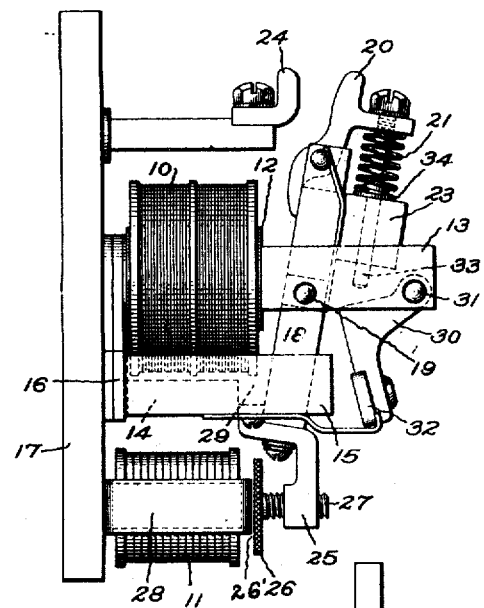

L. P. HUTT.
MEANS FOR CONTROLLING THE CIRCUITS OF ELECTRIC MOTORS.
APPLICATION FILED MAY 18, 1916.

1,306,544.  
Patented June 10, 1919.

Inventor:
Leonard P. Hutt,
by Alfred H. Davis
His Attorney.

UNITED STATES PATENT OFFICE.

LEONARD P. HUTT, OF SCHENECTADY, NEW YORK, ASSIGNOR TO GENERAL ELECTRIC COMPANY, A CORPORATION OF NEW YORK.

MEANS FOR CONTROLLING THE CIRCUITS OF ELECTRIC MOTORS.

1,306,544.

Specification of Letters Patent. Patented June 10, 1919.

Application filed May 18, 1916. Serial No. 98,419.

*To all whom it may concern:*

Be it known that I, LEONARD P. HUTT, a subject of the King of Great Britain, residing at Schenectady, county of Schenectady, State of New York, have invented certain new and useful Improvements in Means for Controlling the Circuits of Electric Motors, of which the following is a specification.

My invention relates to means for controlling the circuits of electric motors and more particularly to means whereby an electric motor may be started and automatically brought up to running speed.

In the starting of electric motors, it has been the practice to employ a plurality of electromagnetic switches which close successively to cut out sections of resistance from the motor circuit and bring the motor up to speed. Various means have been devised for controlling the operation of the switches so that they will only close when the current is at a proper value, that is, after a switch has operated to cut out a section of resistance the next switch will not operate until the current has dropped to a safe value due to the speeding up of the motor. One of the well known methods is to have the switches operated by shunt coils which may be under the control of the operator and the circuit of the shunt coils is controlled by the motor current. A winding in series with the motor commonly called a "throttle" magnet is arranged to prevent the closure of the circuit of the contactor next to operate until the current drops to the proper value. More recently, a switch has gone into general use which has only a single winding in the motor circuit and has the peculiar characteristics that it holds open when the current in the winding is above a predetermined value and closes when the current falls to that value. Such a switch is disclosed in an application of Walter O. Lum, Serial No. 611,151, filed Feb. 27, 1911 and in a modified form is disclosed in application of Edwin J. Murphy, Serial No. 608,652, filed Feb. 15, 1911. This switch is ideal under certain conditions but it is not suitable where it is desired to "notch back", that is, to reinsert the resistance step by step. Moreover, in some cases, there is danger of the current dropping to zero temporarily due to reversal of current or "pump back" and the switch would therefore open unless some means such as a shunt coil is provided to hold the switch closed. The switch of greatest general utility, therefore, is one that is closed by a shunt coil under the control of the motor current but any arrangement of this character which has appeared up to the present time has been open to more or less objection. In the case of the "throttle" controlling the "shunt" switch, the system is complicated by interlocking or auxiliary contacts which are a frequent source of trouble. A form of switch which has frequently been proposed to avoid this is one in which a shunt coil closes the switch and a series coil instead of controlling the circuit of the shunt coil, prevents the switch from closing by actually holding it open, that is, the shunt coil pulls against the series or "holding out" coil. Such a switch is disclosed in a patent to Frazer 655,335. The difficulty with the device shown in this patent and in fact with all switches of this general character which have heretofore been proposed is that the value of current in the holding out winding at which the switch will close will depend upon the pull of the shunt coil which of course will vary with the voltage and also with the temperature of the coil. In other words, the "setting" of the switch, *i. e.* the motor current value at which it closes, changes with change of voltage. It also closes at one value of current in the series coil when the shunt coil is cold and another when it is at its operating temperature which is ordinarily about 60 degrees C.

In carrying out my invention, I provide an electromagnetic switch of the general character just described, that is, one operated by an electromagnet which would ordinarily be a shunt coil but is positively prevented from operating while the current is above a predetermined value by a winding carrying motor current, the arrangement of the switch being such that the "setting" is not influenced by the changes of pull of the operating coil due to any cause.

In one form of my invention, I so arrange the switch arm that it is held in open position by the flux due to the series coil and provide a movable member which moves upon the energization of the shunt coil to apply a spring pressure tending to move the switch arm to closed position. The flux due to the shunt coil acting across an air gap also holds the switch arm open initially. The movable member in addition to applying a spring pressure to the switch arm shunts some of the flux away from the holding out gap of the shunt coil and when in this shunting position forms a pole piece which attracts the switch arm and holds it when it moves to closed position. When the current in the series coil is above the value at which it is set to close the switch arm will be substantially balanced so far as the shunt coil is concerned between the shunting pole piece and the holding out pole piece so that any variation in pull of the shunt coil will have substantially no effect upon the closing of the switch arm. The closing depends only on the pull of the series coil which is opposed by the spring. When the current in the series coil drops to a predetermined value the movement of the switch arm is initiated by the spring. This causes the magnetic balance to be disturbed so that the closing force of the shunt coil will predominate and close the switch.

Figure 2:
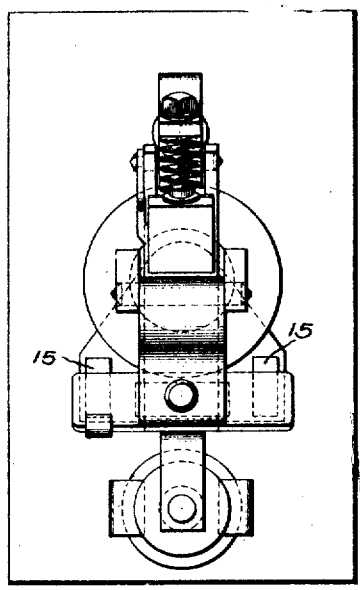
Figure 4:
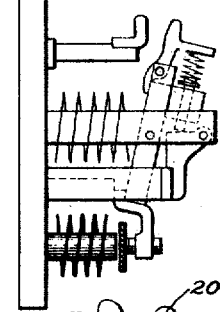
Figure 3:
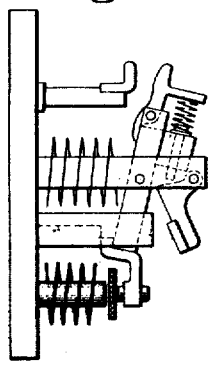
Figure 5:
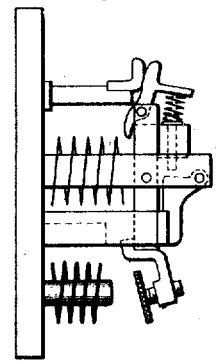
Figure 6:
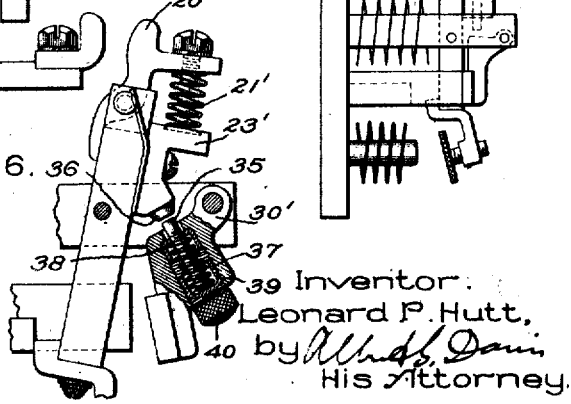

In the accompanying drawing, illustrating one form of my invention, Figure 1 is a side elevation of a switch embodying my invention; Fig. 2 is an end view of the same, Fig. 3 is a diagrammatic view showing the position of the parts when the switch is open, Fig. 4 shows a similar view when the coils have been energized and before the switch is closed; Fig. 5 shows the switch in closed position; and Fig. 6 shows a modification of the switch.

Referring to the drawing it will be seen that the switch has an operating winding 10 which closes the switch and a holding out winding 11 which holds the switch open until the current in the winding falls to a predetermined value. The coil 10 is shown as a fine wire winding such for instance as is ordinarily connected across the line and called a "shunt" coil. The coil 11 is shown as a coarse wire winding such as is commonly called a "series" coil since it is connected in series with the armature and carries the armature current. Since the switch is intended primarily for a motor starting switch, the current in the coil 11 will rise when a section of resistance is cut out of circuit and will again drop as the counter E. M. F. of the motor builds up in a manner well understood in the art. When the coils are energized, spring pressure is applied to the switch arm tending to close it but this closing force is opposed by the holding out winding. The effect of the shunt coil upon the switch arm so far as it tends to initiate the closing of the switch is substantially neutralized so that any changes in magnetization due to current changes in the shunt coil have substantially no effect upon the closing of the switch. The factor which determines the closing of the switch is the current in the series coil. The structure whereby this result is accomplished is as follows:

The magnet frame for the coil 10 is U-shaped, one of the legs being a central core 12 for the coil, formed at its outer end into a yoke 13 in which the switch arm and an auxiliary member which applies the spring pressure to the switch arm are pivoted. The outside leg of the U-shaped frame consists of three members, a short main pole piece 14 and two longer auxiliary pole pieces 15, one on each side of the main pole piece and spaced therefrom. The two legs of this magnet frame, that is the central pole piece 12 and the three members of the outside pole piece are magnetically joined by the member 16 which is mounted upon the slate base 17.

The switch member 18 is pivoted at 19 in the yoke 13 and has at its upper end a pivoted contact 20 and a spring 21 which is mounted between the contact 20 and the lug 23 to cause a yielding pressure between the contact 20 and the stationary contact 24. This spring has also another function hereinafter pointed out. The lower end of the switch member is provided with a bracket 25 of non-magnetic material which secured at the end of the switch member and extends back of the member so as to engage the pole piece 14 in the normal position of the switch member. An armature 26 of magnetic material is adjustably secured to the bracket 25 by means of a screw shank 27 which screws into the bracket. The holding out coil 11 is provided with a U-shaped frame 28 of magnetic material which is bent over the outer end of the coil so as to leave a gap to be nearly bridged by the armature 26, there being a gap 26' between the armature 26 and frame 28. In the normal position of the switch member, the armature 26 nearly bridges the gap in the magnetic frame 28 and the upper end of the bracket rests against the pole piece 14 leaving a gap 29 between the switch member and the pole piece 14.

An auxiliary member 30 of non-magnetic material is pivoted in the yoke 13 at 31. This member is angular in shape and has secured to its lower end an armature 32 of magnetic material which is adapted to bridge the two auxiliary pole pieces 15. The upper end of this member forms a shoulder adapted to engage a pin 33 which slides in the lug 23. This pin has at its upper end a head 34 upon which the spring 21 rests so that when the pin 33 moves upward, the spring will be compressed. The pin is of such a length that it will be engaged by the shoulder and compress the spring while the auxiliary arm moves inward toward the pole pieces. As shown the shoulder will not engage the pin until toward the ends of its movement, that is, just before the armature 32 bridges the auxiliary pole piece 15.

It will be noted that when the armature 32 is in engagement with the pole pieces 15, that there is a gap between the armature 32 and the switch member substantially equal to the gap 29 between the switch member and the pole piece 14. (See Fig. 4). The armature 32 in this position will cause flux to be shunted away from the gap 29 and since the gaps on either side of the switch are practically equal, the switch member will be substantially balanced magnetically, so far as the pull of the two pole pieces is concerned. In other words, when the parts are in the position shown in Fig. 4, changes of current in the shunt coil 10 due to variation of line voltage or to changes of temperature of the coil will have substantially no effect upon the switch member since the effects upon opposite sides of the switch member will be equal. This leaves only two forces which are effective upon the switch member namely, the pressure of the spring 21 tending to close the switch which is a constant force, and the magnetic pull of the magnet 11, which is a variable force. With proper adjustment therefore, the closing force is caused to overcome the holding out force when the current in the winding 11 reaches a desired value. Obviously when the switch member once starts to close, the shunt coil becomes effective since the air gap 29 is lengthened while the other air gap is shortened. The closing movement is therefore accelerated by the armature 32 which acts as a pole piece to powerfully attract the switch member and wipe the contacts upon each other in a well understood manner.

The operation of my device will now be understood: Assume that the winding 10 is connected across the supply circuit and that the winding 11 is either simultaneously or previously connected in a separate circuit in which the current varies, as for instance in the armature circuit of a motor during starting. The parts being normally in the position shown in Figs. 1 and 3, when the coils are energized the switch member will maintain its position while the auxiliary member 30 will be moved inward so that the armature 32 bridges the auxiliary pole pieces 15. This condition is shown in Fig. 4. The movement of the auxiliary member first compresses the spring 21 thereby giving the switch member a tendency to close. When the spring is compressed the pole pieces 15 are bridged and the switch member is magnetically balanced so far as the shunt coil is concerned as above pointed out. The switch member now has a tendency to close due to the spring pressure which tendency is opposed by the holding out or series coil. When the current in the winding therefore drops to a predetermined value, the holding force of the series coil will be overcome by the spring. It is only necessary that the spring initiate the closing movement since as soon as the switch member starts to move, the pole piece 32 takes control of the switch member and closes it energetically. The switch member will now be held in closed position very effectively since there is a closed magnetic circuit around through the U-shaped magnet frame to the pole piece 32 and the switch member. This condition is shown in Fig. 5.

In Fig. 6 I have shown a modified arrangement for giving the switch its closing tendency. In this form instead of giving the spring 21 two functions, namely, that of causing a yielding pressure between the contacts and also giving the switch member a tendency to close, I provide a separate spring for the latter function. Referring to Fig. 6, it will be seen that the spring 21' is mounted between the contact 20 and a fixed bracket 23'. The auxiliary member 30' is provided with a spring pressed plunger 35 which engages the switch member at the projection 36 when the auxiliary member is moved inward and compresses the spring 37. This spring is inclosed between two cup shaped portions 38 and 39. The plunger is screw threaded into the cup 38 and the cup 39 is screw threaded into the walls of the chamber which incloses the cups and the spring. The knurled head 40 is secured to the cup 38 so that by turning the head, the cup 39 will be screwed inward and the spring compressed, thereby adjusting the tension of the spring. When the auxiliary arm is moved inward, the plunger engages the switch arm and compresses the spring arms giving the spring a closing tendency. Otherwise the switch operates the same as the form above described.

What I claim as new and desire to secure by Letters Patent of the United States, is,—

1. An electromagnetic switch comprising an operating winding, a switch arm normally in open position, a member moved by the operating winding, means which, upon the completion of the movement of said member, causes a constant force to be applied tending to move the switch arm to closed position, said member acting as a pole-piece to hold the switch arm in closed position, and a holding-out winding for holding the switch arm in open position until the current in said winding drops to a predetermined value.

2. An electromagnetic switch comprising an operating winding, a switch arm normally in open position, a member moved by the operating winding, means which, upon the completion of the movement of said member, causes a constant force to be applied tending to move the switch arm to closed position, a pole-piece moved into proximity with the switch arm by the movement of the member to hold the switch arm in closed position, and a holding-out winding for holding the switch arm in open position until the current in said holding-out winding falls to a predetermined value.

3. An electromagnetic switch comprising an operating winding, a switch arm normally in open position and initially held in said position by the energization of said winding, a member moved by the operating winding, means which, upon the completion of the movement of said member, causes a constant force to be applied which counteracts said holding effect and tends to move the switch arm to closed position and a holding-out winding for holding the switch arm in open position until the current in said holding winding falls to a predetermined value.

4. An electromagnetic switch comprising an operating winding, a switch arm normally in open position and initially held in said position by the energization of said winding, a member moved by the operating winding, means which, upon the completion of the movement of said member, causes a constant force to be applied which counteracts said holding effect and tends to move the switch arm to closed position, said member being provided with a pole-piece to hold the switch arm in closed position and a holding-out winding for holding the switch arm in open position until the current in said holding winding falls to a predetermined value.

5. An electromagnetic switch comprising an operating winding, a switch arm normally in open position and initially held in said position by said winding, a member moved by the operating winding, means which, upon the completion of the movement of said member, causes the holding effect of said winding to be decreased and applies a constant force which counteracts the holding effect said member also acting to hold the switch member in closed position and a holding-out winding for holding the switch arm in open position until the current in said holding-out winding falls to a predetermined value.

6. An electromagnetic switch comprising an operating winding, a switch arm normally in open position, a spring, a member moved by the operating winding to place the spring under strain tending to move the switch arm to closed position, said member being provided with a pole-piece for holding the switch arm in closed position and a holding out winding for holding the switch arm in open position until the current in said holding-out winding falls to a predetermined value.

In witness whereof, I have hereunto set my hand this 17th day of May, 1916.

LEONARD P. HUTT.